(12) United States Patent
Lee et al.

(10) Patent No.: US 8,559,170 B2
(45) Date of Patent: Oct. 15, 2013

(54) MOTHERBOARD ASSEMBLY AND CENTRAL PROCESSING UNIT EXPANSION CARD

(75) Inventors: Yao-Tsung Lee, New Taipei (TW); Yi-Cheng Tseng, New Taipei (TW); Chun-Hsien Tsai, New Taipei (TW); Feng-Ming Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 166 days.

(21) Appl. No.: 13/207,459

(22) Filed: Aug. 11, 2011

(65) Prior Publication Data
US 2013/0021742 A1   Jan. 24, 2013

(30) Foreign Application Priority Data
Jul. 22, 2011 (TW) .............................. 100125916 A

(51) Int. Cl.
G06F 1/16 (2006.01)
H05K 5/00 (2006.01)
H05K 7/00 (2006.01)
H05K 1/14 (2006.01)

(52) U.S. Cl.
USPC ............ 361/679.32; 361/679.41; 361/679.43; 361/728; 361/736; 361/785

(58) Field of Classification Search
USPC ............. 361/679.01, 679.02, 679.31, 679.32, 361/679.4, 679.41, 679.43, 728, 729, 730, 361/731, 732, 735, 736, 737, 740, 741, 747, 361/748, 752, 753, 759, 760, 784, 785, 786, 361/787, 788, 789, 790, 791, 792, 801, 361/802; 710/301
See application file for complete search history.

(56) References Cited

U.S. PATENT DOCUMENTS 6,496,376 B1 * 12/2002 Plunkett et al. ............... 361/729
2012/0069510 A1 * 3/2012 Tan .......................... 361/679.02

* cited by examiner

Primary Examiner — Hoa C Nguyen
Assistant Examiner — Binh Tran
(74) Attorney, Agent, or Firm — Altis & Wispro Law Group, Inc.

(57) ABSTRACT

A central processing unit (CPU) expansion card may be inserted into a first connector of a motherboard. The CPU expansion card includes a board, a CPU socket mounted on the board, a number of memory slots mounted on the board and electrically connected to the CPU socket, and a second connector electrically connected to the CPU socket and mounted on the bottom side of the board to be inserted into the first connector of the motherboard.

15 Claims, 5 Drawing Sheets

MOTHERBOARD ASSEMBLY AND CENTRAL PROCESSING UNIT EXPANSION CARD

BACKGROUND

1. Technical Field

The present disclosure relates to motherboard assemblies, and particularly, to a motherboard having a central processing unit (CPU) expansion card.

2. Description of Related Art

Generally, there are two types of motherboards. A first type of motherboard includes only one CPU. The size of the first type of motherboard is 12 inch×10.5 inch. A second type of motherboard includes two CPUs. The size of the second type of motherboard is 12 inch×13 inch. However, the processing ability of the first type of motherboards is weaker than the second type of motherboards, while the second type of motherboards is more costly. What is desired, therefore, is to provide a motherboard assembly and a CPU expansion card which overcome the above problem.

BRIEF DESCRIPTION OF THE DRAWINGS

Many aspects of the present embodiments can be better understood with reference to the following drawings. The components in the drawing are not necessarily drawn to scale, the emphasis instead being placed upon clearly illustrating the principles of the present disclosure. Moreover, in the drawing, all the views are schematic, and like reference numerals designate corresponding parts throughout the several views.

DETAILED DESCRIPTION

The disclosure, including the accompanying drawings in which like references indicate similar elements, is illustrated by way of example and not by way of limitation. It should be noted that references to "an" or "one" embodiment in this disclosure are not necessarily to the same embodiment, and such references mean at least one.

Figure 1:
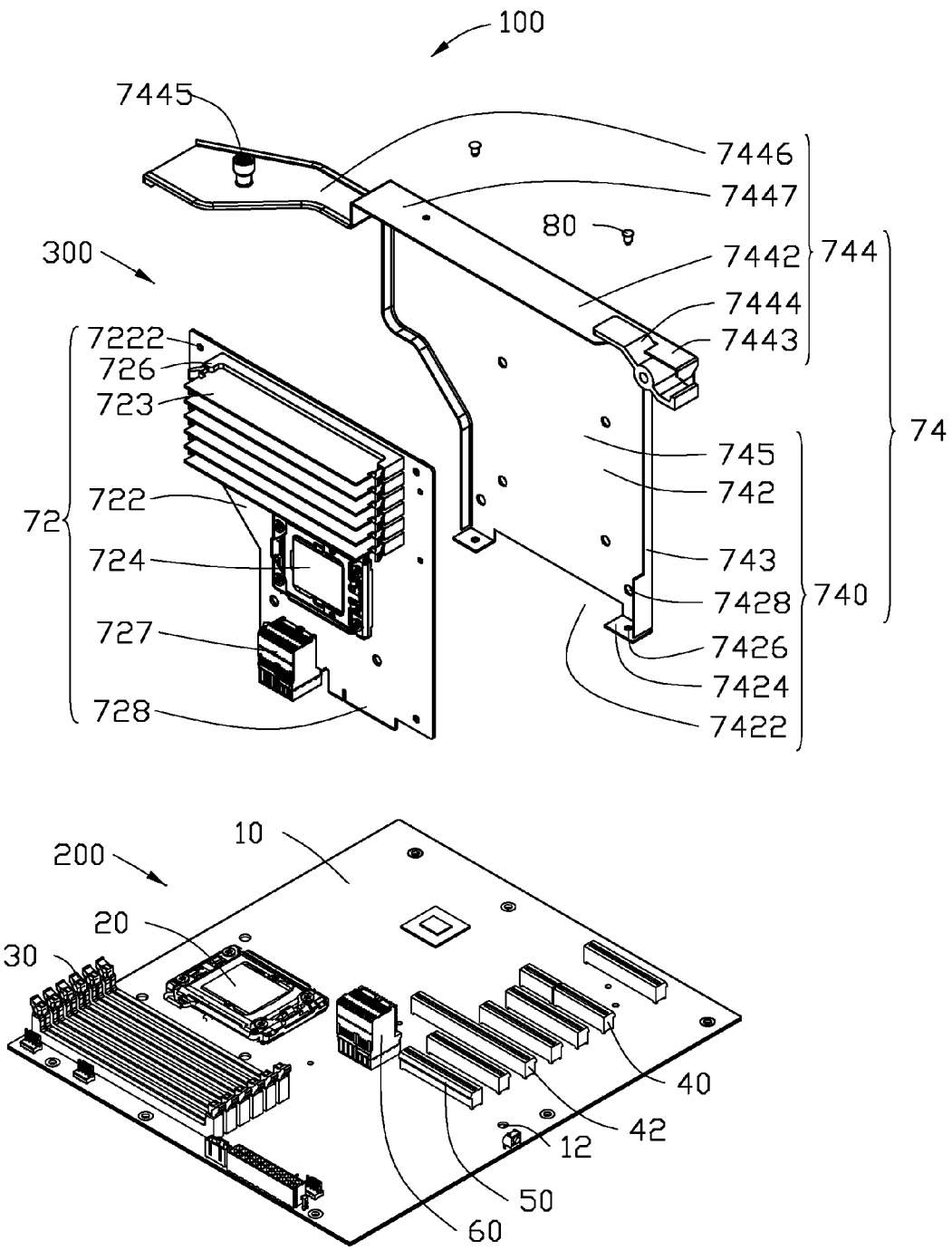
FIG. 1 is an exploded, isometric view of an exemplary embodiment of a motherboard assembly, wherein the motherboard assembly includes a central processing unit (CPU) expansion card.

Referring to FIG. 1, an embodiment of a motherboard assembly 100 includes a motherboard 200 and a central processing unit (CPU) expansion card 300.

The motherboard 200 includes a first board 10, a first CPU socket 20, a plurality of first memory slots 30, a Peripheral Component Interconnection Express (PCIe) interface 40, a PCIe expansion interface 42, a PCIe connector 50, and a first high speed backplane connector 60. The first CPU socket 20, the first memory slots 30, the PCIe interface 40, the PCIe expansion interface 42, the PCIe connector 50, and the first high speed backplane connector 60 are mounted on the first board 10. The first high speed backplane connector 60 is near the PCIe connector 50, and is connected to the CPU expansion card 300 together with the PCIe connector 50. The first CPU socket 20 is electrically connected to the first memory slots 30, to allows a CPU (not shown) to be inserted into the first CPU socket 20 to communicate with memory modules (not shown) inserted into the first memory slots 30. The first CPU socket 20 is also electrically connected to the PCIe interface 40, to allow the CPU to be inserted into the first CPU socket 20 to communicate with a PCIe card inserted into the PCIe interface 40. The first CPU socket 20 is further electrically connected to the first high speed backplane connector 60. The expansion PCIe interface 42 is electrically connected to the PCIe connector 50. Two through holes 12 are defined in the first board 10, at opposite sides of the first high speed backplane connector 60 and the PCIe connector 50.

The CPU expansion card 300 includes a main body 72 and a supporting element 74. The main body 72 includes a polygonal second board 722, a second CPU socket 724, a plurality of second memory slots 726, a second high speed backplane connector 727, and an edge connector 728. The second CPU socket 724, the second memory sockets 726, the second high speed backplane connector 727, and the edge connector 728 are all mounted on the second board 722. The second high speed backplane connector 727 and the edge connector 728 are adjacent to each other, to be connected to the first high speed backplane connector 60 and the PCIe connector 50, respectively. The second high speed backplane connector 727 is electrically connected to the second CPU socket 724. The second CPU socket 724 is electrically connected to the second memory slots 726, to allow a CPU inserted into the second CPU socket 724 to communicate with memory modules 723 inserted into the second memory slots 726. Four first through holes 7222 are defined in the four corners of the second board 722.

The supporting element 74 includes a base 740 and a bracket 744.

The base 740 includes a polygonal base board 742 and two sidewalls 743 perpendicularly extending from opposite sides of the base board 742. A receiving space 745 is bounded by the sidewalls 743 and the base board 742. A cutout 7422 is defined in the bottom of the base board 742. Two fixing sheets 7424 perpendicularly extend from the bottom of the base board 742, and are located at the two opposite sides of the cutout 7422. A through hole 7426 is defined in each fixing sheet 7424. Four second through holes 7428, corresponding to the four first through holes 7222, are defined in the four corners of the base board 742.

The bracket 744 includes a connection portion 7442 extending from the top of the base board 742 opposite to the cutout 7422, a latching element 7444 formed on a first terminal 7443 of the connection portion 7442, and a fixing portion 7446 extending from a second terminal 7447 of the connection portion 7442. A screw 7445 engages in the fixing portion 7446.

Figure 2:
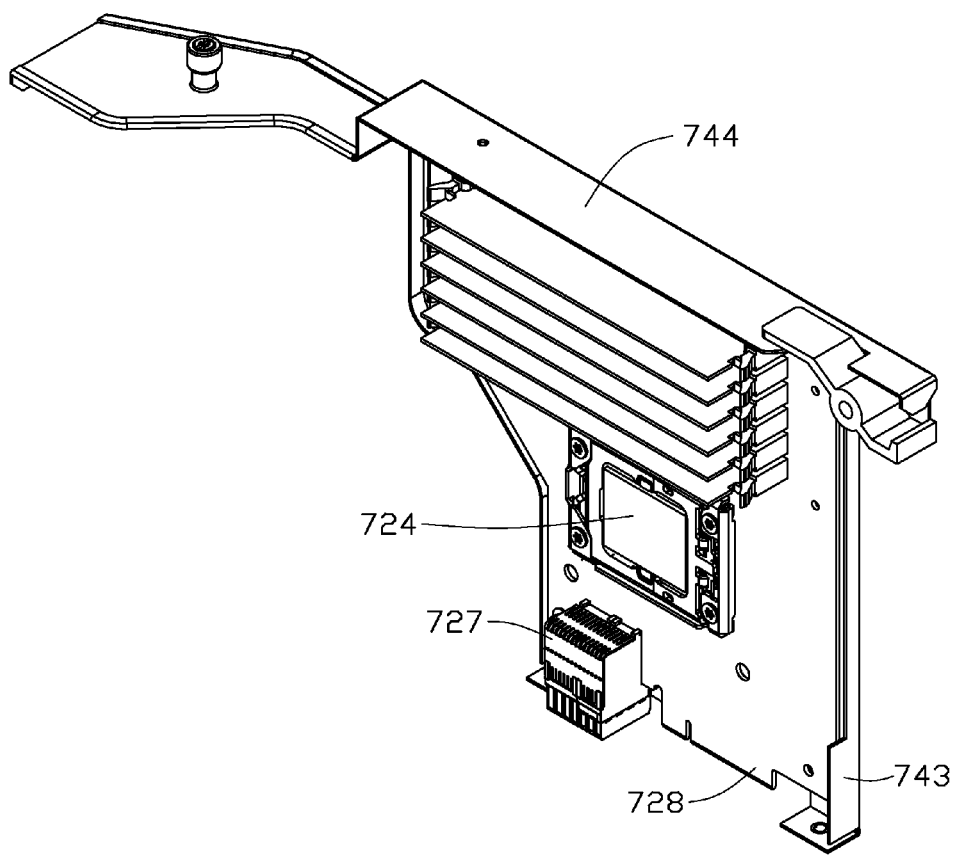
FIG. 2 is isometric view of the CPU expansion card of FIG. 1, assembled.
Figure 3:
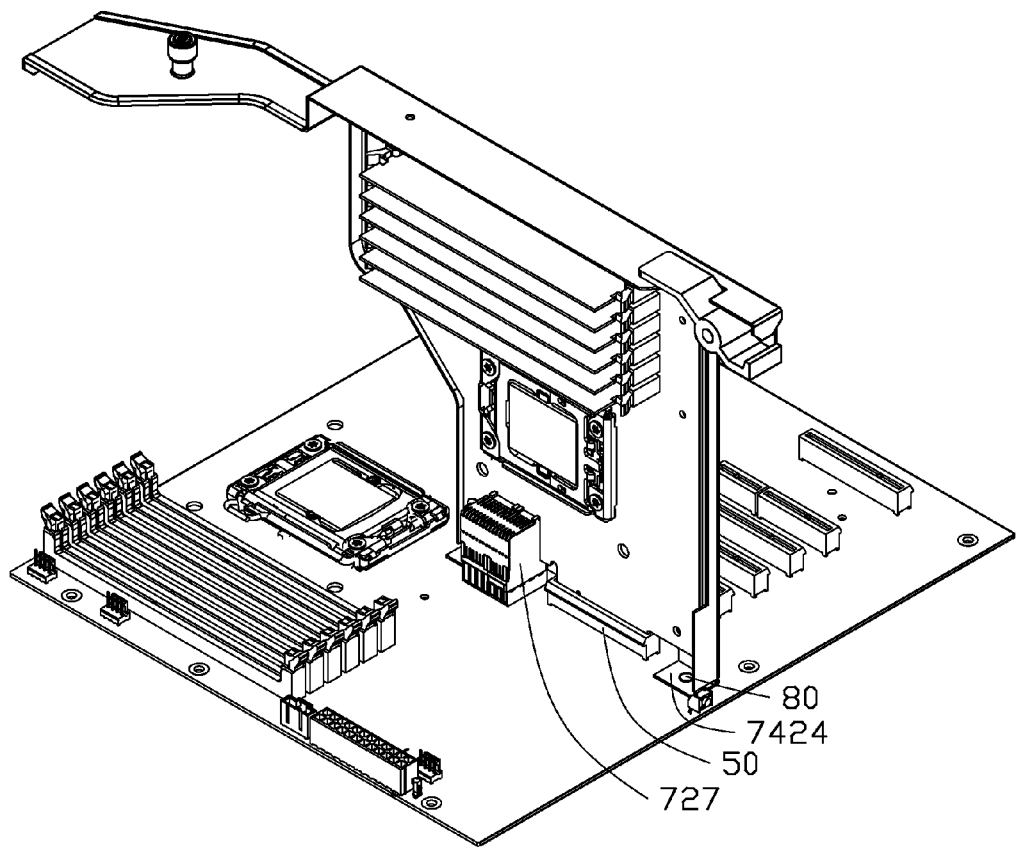
FIG. 3 is an isometric view of FIG. 1, assembled.

Referring to FIGS. 2 and 3, in assembly, the main body 72 of the CPU expansion card 300 is received in the receiving space 745 of the supporting element 74. The first through holes 7222 of the main body 72 align with the second through holes 7428 of the base board 742. Screws (not shown) extend through the first through holes 7222 and are engaged in the second through holes 7428 to fix the main body 72 on the base board 742. The second high speed connector 727 and the edge connector 728 are located in the cutout 7422.

The second high speed backplane connector 727 and the edge connector 728 of the CPU expansion card 300 are inserted respectively into the first high speed backplane connector 60 and the edge connector 50 of the motherboard 200. Thereby, the through holes 7426 of the fixing sheets 7424 align with the through holes 12 of the first board 10. Two fasteners 80 extend through the through holes 7426 and are engaged in the through holes 12 to fix the CPU expansion card 300 onto the motherboard 200.

Figure 4:
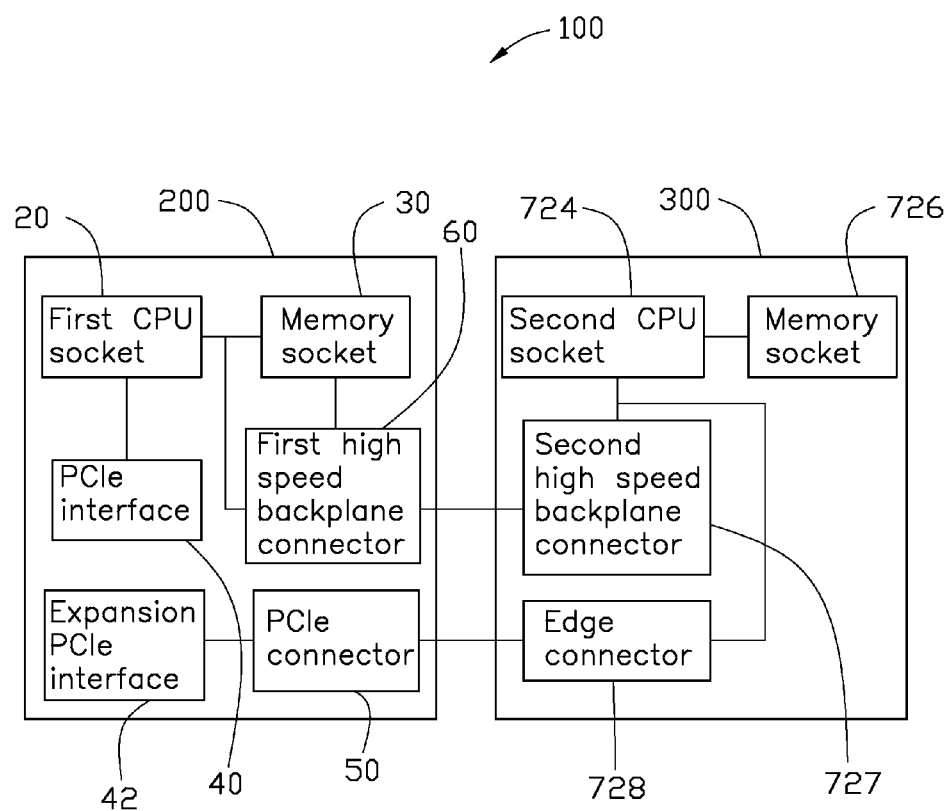
FIG. 4 is a block diagram of the motherboard assembly of FIG. 1.
Figure 5:
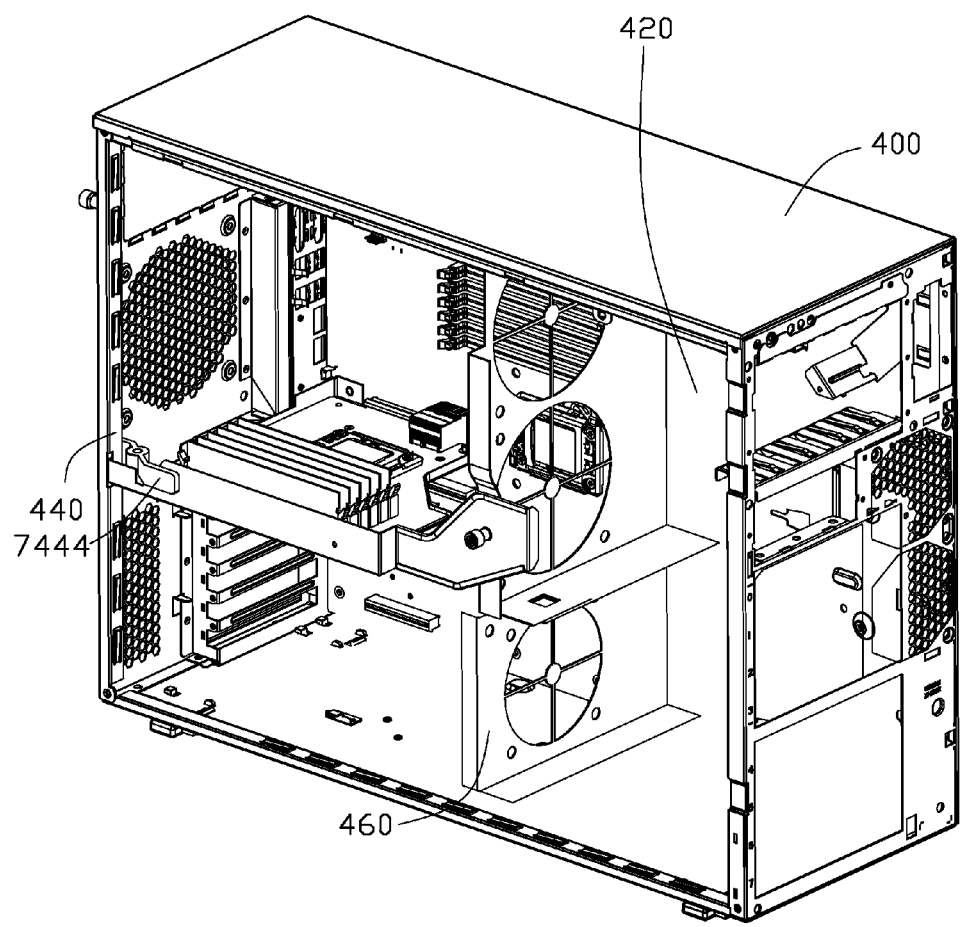
FIG. 5 is an isometric view of the motherboard assembly of FIG. 3 mounted in a computer enclosure.

Referring to FIGS. 4 and 5, in use, the motherboard assembly 100 is mounted on a sidewall 420 of an enclosure 400. The latching element 7444 of the bracket 744 is engaged in a slot (not shown) of a rear wall of the enclosure 400 neighboring the sidewall 420. The screw 7445 is engaged in a through hole (not shown) of a middle board 460 of the enclosure 400, to reinforce the strength of the connection between the motherboard assembly 100 and the enclosure 400. When the motherboard 200 is operating, the CPU inserted into the first CPU socket 20 communicates with the CPU inserted into the second CPU socket 724 through the first and second high speed backplane connectors 60 and 727. The CPU inserted into the second CPU socket 724 may communicate with the PCIe card inserted into the PCIe expansion interface 42 through the edge connector 728 and the PCIe connector 50.

Although numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A central processing unit (CPU) expansion card to be inserted into a first connector of a motherboard, the CPU expansion card comprising:
a board;
a CPU socket mounted on the board;
a plurality of memory slots mounted on the board and electrically connected to the CPU socket;
a second connector electrically connected to the CPU socket and mounted on a bottom side of the board to be inserted into the first connector of the motherboard;
a base board; and
two sidewalls extending in a substantially perpendicular manner from opposite sides of the base board, wherein a receiving space is bounded by the base board and the sidewalls to receive the board, two fixing sheets extend in a substantially perpendicular manner from a bottom side of the base board, a through hole is defined in each fixing sheet, to fix the CPU expansion card on the motherboard through a screw.

2. The CPU expansion card of claim 1, further comprising an edge connector mounted to the bottom side of the board to be electrically connected to a Peripheral Component Interconnection Express (PCIe) connector of the motherboard.

3. The CPU expansion card of claim 1, further comprising a bracket, wherein the bracket extending from a top side of the base board.

4. The CPU expansion card of claim 3, wherein the bracket comprises a connection portion connected to the top side of the base board, a latching element mounted on a first terminal of the connection portion, and a fixing portion extending from a second terminal of the connection portion opposite to the first terminal.

5. The motherboard assembly of claim 1, wherein the second connector is a high speed backplane connector.

6. A motherboard assembly comprising:
a motherboard comprising:
a first board;
a central processing unit (CPU) socket mounted on the first board;
a plurality of first memory slots mounted on the first board and electrically connected to the first CPU socket; and
a first connector mounted on the first board and electrically connected to the first CPU socket; and
a CPU expansion card comprising:
a second board;
a second CPU socket mounted on the second board;
a plurality of second memory slots mounted on the second board and electrically connected to the second CPU socket;
a second connector electrically connected to the second CPU socket and mounted on a bottom side of the second board to be inserted into the first connector of the motherboard;
a base board; and
two sidewalls extending in a substantially perpendicular manner from opposite sides of the base board, wherein a receiving space is bounded by the base board and the sidewalls to receive the second board of the CPU expansion card, two fixing sheets extend in a substantially perpendicular manner from a bottom side of the base board, a first through hole is defined in each fixing sheet, two second through holes, corresponding to the first through holes, are defined in the first board, the CPU expansion card is fixed on the first board through two fasteners extending through the first through holes to engage in the second through holes.

7. The motherboard assembly of claim 6, wherein the motherboard further comprises a Peripheral Component Interconnection Express (PCIe) expansion interface, and a PCIe connector near the first connector, the PCIe expansion interface and the PCIe connector are both mounted on the first board, the PCIe connector is electrically connected to the PCIe expansion interface, the CPU expansion card further comprises an edge connector mounted to the bottom side of the second board and near the second connector, to be connected to the PCIe connector.

8. The motherboard assembly of claim 6, wherein the CPU expansion card further comprises a bracket extending from a top side of the base board.

9. The motherboard assembly of claim 8, wherein the bracket comprises a connection portion connected to the top side of the base board, a latching element formed on a first terminal of the connection portion, and a fixing portion extending from a second terminal of the connection portion opposite to the first terminal 10. The motherboard assembly of claim 6, wherein the first and second connectors are high speed backplane connectors.

11. An assembly comprising:
an enclosure comprising a sidewall; and
a motherboard assembly comprising:
a motherboard mounted on the sidewall, the motherboard comprising:
a first board;
a central processing unit (CPU) socket mounted on the first board;
a plurality of first memory slots mounted on the first board and electrically connected to the first CPU socket; and
a first connector mounted on the first board and electrically connected to the first CPU socket; and
a CPU expansion card comprising:
a second board;
a second CPU socket mounted on the second board;

a plurality of second memory slots mounted on the second board and electrically connected to the second CPU socket;

a second connector electrically connected to the second CPU socket and mounted on a bottom side of the second board to be inserted into the first connector of the motherboard;

a base board; and two sidewalls extending in a substantially perpendicular manner from opposite sides of the base board, a receiving space is bounded by the base board and the sidewalls to receive the second board of the CPU expansion card, two fixing sheets extend in a substantially perpendicular manner from a bottom side of the base board, a first through hole is defined in each fixing sheet, two second through holes, corresponding to the first through holes, are defined in the first board, the CPU expansion card is fixed on the first board through two fasteners extending through the first through holes to engage in the second through holes.

12. The assembly of claim 11, wherein the motherboard further comprises a Peripheral Component Interconnection Express (PCIe) expansion interface, and a PCIe connector near the first connector, the PCIe expansion interface and the PCIe connector are both mounted on the first board, the PCIe connector is electrically connected to the PCIe expansion interface, the CPU expansion card further comprises an edge connector mounted to the bottom side of the second board and near the second connector, to be connected to the PCIe connector.

13. The assembly of claim 11, wherein the enclosure further comprises a rear wall neighboring the sidewall, the CPU expansion card further comprises a bracket extending from a top side of the base board to be engaged with the rear wall to reinforce the connection between the motherboard and the enclosure.

14. The assembly of claim 13, wherein the enclosure further comprises a middle wall opposite to the rear wall, the bracket comprises a connection portion connected to the top side of the base board, a latching element formed on a first terminal of the connection portion to be engaged with the rear wall of the enclosure, and a fixing portion extending from a second terminal of the connection portion opposite to the first terminal to be engaged with the middle wall to reinforce the connection between the motherboard and the enclosure.

15. The assembly of claim 11, wherein the first and second connectors are high speed backplane connectors.

* * * * *